(12) United States Patent
Poris

(10) Patent No.: US 6,762,846 B1
(45) Date of Patent: Jul. 13, 2004

(54) SUBSTRATE SURFACE PROFILE AND STRESS MEASUREMENT

(75) Inventor: Jaime Poris, Boulder Creek, CA (US)

(73) Assignee: Nanometrics Incorporated, Milpitas, CA (US)

( * ) Notice: Subject to any disclaimer, the term of this patent is extended or adjusted under 35 U.S.C. 154(b) by 0 days.

(21) Appl. No.: 10/247,135

(22) Filed: Sep. 19, 2002

(51) Int. Cl.[7] .............................................. G01B 11/14
(52) U.S. Cl. ....................................... 356/609; 346/601
(58) Field of Search ................................. 356/600–614, 356/622–625, 630, 635, 640; 250/560, 561

(56) References Cited

U.S. PATENT DOCUMENTS

| | | | | |
|---|---|---|---|---|
| 5,157,735 A | * | 10/1992 | Maeda et al. ................ 382/141 |
| 5,227,641 A | * | 7/1993 | Cheng .................... 250/559.23 |
| 5,232,547 A | * | 8/1993 | Drowley et al. .............. 117/55 |
| 5,293,215 A | | 3/1994 | Pfendler et al. ............ 356/360 |
| 5,473,424 A | * | 12/1995 | Okumura ............... 356/139.03 |
| 5,506,672 A | | 4/1996 | Moslehi ...................... 356/359 |
| 5,737,084 A | * | 4/1998 | Ishihara ...................... 356/609 |
| 6,400,456 B1 | * | 6/2002 | Miyachi ..................... 356/399 |
| 2001/0002860 A1 | | 6/2001 | Maris et al. ................ 356/432 |
| 2002/0012122 A1 | | 1/2002 | Boyd et al. ................. 356/369 |

FOREIGN PATENT DOCUMENTS

JP        411 097 342        *  4/1999

* cited by examiner

*Primary Examiner*—Frank G. Font
*Assistant Examiner*—Sang H. Nguyen
(74) *Attorney, Agent, or Firm*—Silicon Valley Patent Group LLP

(57) ABSTRACT

The focusing capability of a metrology tool is used to determine the surface profile of a substrate and the stress on the substrate that is associated with processing step, such as layer deposition or etching. The amount of focusing adjustment necessary to place the substrate in focus is used to determine the height of the surface of the substrate at three or more locations. Based on the surface profile, a curvature parameter may be calculated. The curvature parameter may be calculated before and after a processing step. The stress associated with the processing step can then determined from these two curvature parameters.

18 Claims, 3 Drawing Sheets

SUBSTRATE SURFACE PROFILE AND STRESS MEASUREMENT

FIELD OF THE INVENTION

The present invention relates to testing substrates and in particular to measuring the surface profile of a substrate and the stress induced on a substrate due to processing.

BACKGROUND

Flat substrates, such as semiconductor wafers, are stressed during certain processing steps, e.g., depositing or etching thin films. Stress in deposited layers can warp the substrate, which can adversely affect subsequent process steps, device performance, reliability and line-width control. Thus, it is desirable to measure the surface profile of a substrate as well as measure the stress on a substrate that is associated with a processing step.

There are many measurement tools available for measurement of a surface profile and analysis of the stress associated with certain processing steps on substrates. Most of the available tools for the semiconductor industry use a laser displacement sensor to measure the surface profile and to monitor the change in radius of curvature of the wafer before and after the processing step. A laser displacement sensor relies on the reflectance of a laser beam from the surface of the sample to quantify the change in angle of incidence of the beam with respect to the wafer. This information can be transformed into an average radius of curvature for an entire diameter of a wafer or an average radius of curvature for a fraction of a diameter allowing the calculation of stress as a function of position along the diameter. This measurement can be repeated at a number of locations within a diameter and at a multitude of diameters to create a map of the stress over an entire wafer.

Laser displacement sensors typically require large optical components. Consequently, these systems are expensive and are generally stand-alone measurement and inspection tools.

It would be advantageous to measure surface profiles and to measure stress using an existing semiconductor metrology tool without adding additional hardware. This could be beneficial for an integrated metrology module (a measurement tool integrated into a process tool to perform a specific metrology function) to save space, reduce cost and increase functionality.

SUMMARY

The focusing capabilities in a metrology tool may be used to determine the surface profile of a substrate and the stress on the substrate that is associated with a processing step, in accordance with an embodiment of the present invention. The surface profile is determined by using the amount of adjustment necessary to place the substrate in focus in the metrology tool at three or more locations. Because the focal distance of a metrology tool is a known fixed distance, the amount of adjustment necessary to place a substrate in focus can be used to determine the surface height at that location. Accordingly, a surface profile can be produced based on a plurality of locations on the sample. A curvature parameter, such as a radius of curvature can then be calculated based on the surface profile. The curvature parameters can be calculated for the substrate before and after a processing step. The stress associated with the processing step can then be determined from these two curvature parameters. Thus, no additional hardware is necessary for a metrology tool to perform a surface profile measurement and stress measurement in accordance with the present invention.

In one embodiment of the present invention, a method includes adjusting the focus of a metrology tool to focus on the surface of a substrate at least at three measurement points. The height of the surface of the substrate is determined for each measurement point based on the amount of adjustment necessary to focus the metrology tool on the surface. The radius of curvature can then be calculated for the measurement points. In addition, the method may include calculating a pre-processed radius of curvature, processing the substrate and calculating a post-processed radius of curvature. The pre-processed and post-processed radii of curvature can be compared to determine the difference and the stress associated with the processing can then be calculated based on the difference in the radius of curvature.

In another embodiment of the present invention, a method includes measuring a first surface profile of a sample based on the adjustment necessary to place the surface in focus in a metrology tool, where the surface profile is measured at least at three locations before a process is executed on the sample. A second surface profile is measured after the process is executed on the sample. A first curvature parameter is calculated from the first surface profile, and a second curvature parameter is calculated from the second surface profile. The stress on the sample associated with the execution of the process can then be calculated using the first and second curvature parameters.

In yet another embodiment of the present invention, an apparatus includes a stage for holding a substrate, where the stage is movable to place the substrate at desired locations. The apparatus also includes an objective lens positioned generally over the stage. The objective lens has a known focal distance and the distance between the stage and objective lens is variable to place the surface of the substrate at the focal distance of the objective lens. The apparatus also includes a computer system coupled to the stage and the objective lens to receive a signal indicating the location of the substrate and a signal indicating the distance varied to place the surface at the focal distance, the computer system having a computer-usable medium having computer-readable program code embodied therein for measuring a surface profile of the sample based on the distance varied to place the surface at the focal distance at each location of the substrate; and calculating a curvature parameter of the substrate from the surface profile. The computer-readable program code may also include calculating a first curvature parameter for the surface profile before the substrate is processed and calculating a second curvature parameter for the surface profile after the substrate is processed. The code compares the first curvature parameter and the second curvature parameter to determine a differential curvature parameter; and calculates the stress associated with the processing based on the differential curvature parameter.

DETAILED DESCRIPTION

In accordance with an embodiment of the present invention, the focusing capability in a metrology tool is used to measure the surface profile of a substrate and the stress associated with processing the substrate. The focusing capabilities in metrology systems typically use vision systems and pattern recognition systems. Where the focusing precision of the metrology tool is relatively small compared to the amount of deflection experienced by the substrate, an adequately precise surface profile and stress measurement can be made. For example, the precision associated with the focusing mechanism of a typically metrology tool is approximately 0.5 microns while the deflection of a substrate from added stress after processing may be approximately 40 microns.

Figure 1:
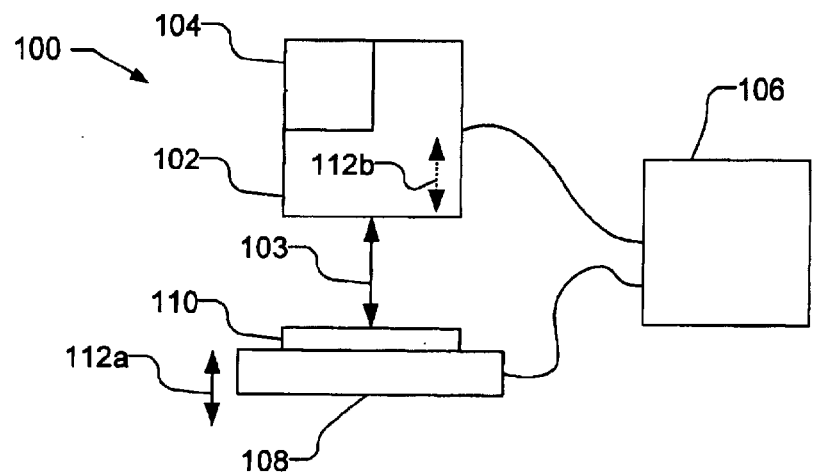
FIG. 1 shows a schematic view of a metrology tool that may be used to monitor the stress on a substrate.

FIG. 1 shows a schematic view of a metrology tool 100 that may be used to monitor the stress on a substrate 110. The metrology tool 100 includes an optical head 102, which includes a focusing system 104. The optical head 102 is coupled to a processor 106. The substrate 110 is held on a stage 108 that is capable of Z motion, as indicated by arrow 112a. Alternatively, the optical head 102 or a portion of the optical head 102, e.g., an objective lens, is movable in the Z direction, as indicated by arrow 112b. The stage 108 is capable of other types of motion in either Cartesian (i.e., X and Y) or polar (i.e., R and θ) coordinate systems or some combination.

As illustrated in FIG. 1, the optical head 102 is positioned generally above the substrate 110 so that the measurement beam 103 is normal to the surface of the sample 110. It should be understood that measurement beam 103 may be specifically for the focusing system 104 or may be a shared optical path for other systems in the metrology tool, e.g., for a reflectometer, scatterometer or the like. For example, broadband light may be used to focus as well as provide a signal for a reflectometer. If desired, a separate laser system, e.g., a confocal system) could be used only for focusing, where it shares the same optical path as the measurement illumination. The optical head 102 includes an objective lens with a known focal length Thus, when the surface of the sample 110 is in focus, the distance between the objective lens and the surface of the sample is known.

The stage 108 can place any position on the sample 110 under the optical head 102. The processor 106 controls the stage 108, optical head 102 and the focusing system 104. The processor 106 also collects and analyzes the data from the stage 108 and optical head 102. Pattern recognition software in the processor may be used to identify specific measurement positions on the sample 100, but is typically not required for stress measurements. The processor 106 may be, e.g., a workstation, a personal computer, or central processing unit, e.g., Pentium 4™ or other adequate computer system. Processor 106 includes a computer-usable medium 107 having computer-readable program code embodied therein for generating a surface profile of the substrate and/or to measure the stress on the substrate, in accordance with the present invention. Generating code to generate a surface profile or to measure the stress on the substrate is well within the abilities of those skilled in the art in light of the present disclosure.

The present invention may be used with a stand alone metrology tool, combined with another metrology tool or as an integrated metrology tool, i.e., a metrology tool that is integrated with an appropriate process tool. For example, the present invention may be a stand alone tool or may use the focusing system in a reflectometer, ellipsometer, scatterometer, or other appropriate metrology tool. Additionally, the tool may be integrated with an appropriate process tool, such as a semiconductor dielectric deposition tool or etching tool. An integrated metrology tool can improve the performance and cost of ownership of a process tool. Advantages include reducing the time between the metrology measurement and the processing of subsequent samples, which allows the optimization of the process tool parameters, and identifying improperly processed samples immediately after processing thereby reducing the number of mis-processed samples.

Figure 2:
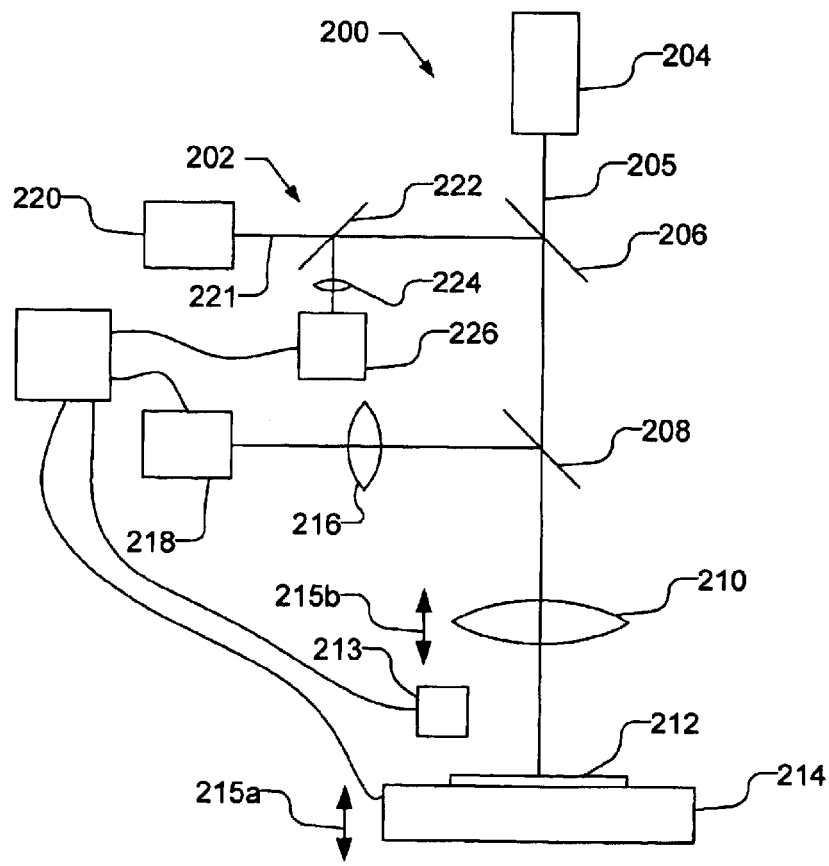
FIG. 2 shows, by way of example, a schematic view of a reflectometer with a vision system that may be used to measure the stress on a substrate in accordance with an embodiment of the present invention.

FIG. 2 shows, by way of example, a schematic view of a reflectometer 200 with a focusing system 202 that may be used to measure the stress on a substrate in accordance with an embodiment of the present invention. Reflectometer 200 includes a light source 204 that produces a light beam 205. The light beam 205 passes through two beam splitters 206 and 208 and is focused by objective lens 210 onto the surface of sample 212, which is held on stage 214. The objective lens 210 may be e.g., a 4× lens with an NA of 0.1 or more. The light that is reflected from the sample 212 passes back through objective lens 210 and is reflected by beam splitter 208 toward detector 218 via lens 216. Either the stage 214 or the objective lens 210 moves vertically as indicated by arrows 215a or 215b.

A pre-alignment system 213 is used to identify the angular orientation of a notch on the sample 212. By using a pre-alignment system 213 the sample 212 can be aligned in the same orientation so that multiple measurements can be made at the same location on the sample at different times. Pre-alignment systems are well known in the art.

The focusing system 202, e.g., includes another light source 220, a beam splitter 222, a lens 224 and detector 226. The light source 220 produces a beam 221 that passes through beam splitter 222 and is reflected by beam splitter 206 toward the sample 212 through objective lens 210. A large spot is produced on the substrate, e.g,. approximately 20u in diameter, to average out the any differences caused by different materials and surface topography. After the beam is reflected off the sample 212, the light passes back through objective lens 210 and is reflected by beam splitters 206 and 222 towards lens 224 that focuses the light onto detector 226. The detector 226 for the focusing system 202, the detector 218 for the reflectometer 200 and the stage 214 are coupled to a processor 228. In some embodiments, the focusing system 202 may use the light from light source 204, and thus, light source 220 and beam splitter 222 may be eliminated.

With the system shown in FIG. 2, the surface profile of the sample 212 may be measured by focusing system 202. Moreover, the surface profile may be measured before and after processing the substrate to generate a stress measurement of the sample 212. Further, the stress measurement may be made while the reflectometer 200 measures other parameters, e.g., the thickness of a deposited layer.

A vacuum should not be used to hold the sample during measurements, as the vacuum will overcome the intrinsic bending forces on the sample, thereby preventing an accurate measurement. Thus, if a vacuum stage 214 is used, the vacuum should be released prior to measurement and turned back on to move the sample to a new location. In general, the release and creation of the vacuum should not ruin the pre-alignment.

It should be understood that FIG. 2 shows an exemplary embodiment of a focusing system that may be used with the present invention. However, any focusing system may be used with the present invention, such as a confocal microscope arrangement or a knife edge focusing system. These systems can share the light source of the metrology tool or implement a dedicated light source.

The surface profile of the substrate is measured by determining the height of the substrate surface at a plurality of measurement points. The surface profile may be measured, e.g., along one or more diameters of the substrate. A curvature parameter may then be generated that describes the surface profile. The curvature parameter, such as the radius of curvature, is determined by measuring the substrate at three or more points to define the curve. Three points are used to determine a single radius of curvature, while four or more points are used to determine multiple radii of curvature, a fraction of a parabola, or some complex polynomial shape. The stress associated with processing a substrate is determined by measuring the radius of curvature of the substrate before and after processing. By measuring the surface profile at one or more diameters of the substrate, a single value of stress or numerous values of stress associated with two or more diameters on the wafer may be generated. Moreover, by measuring more than three points on a diameter to produce a surface profile, numerous values of stress may be generated for that diameter.

Figure 3:
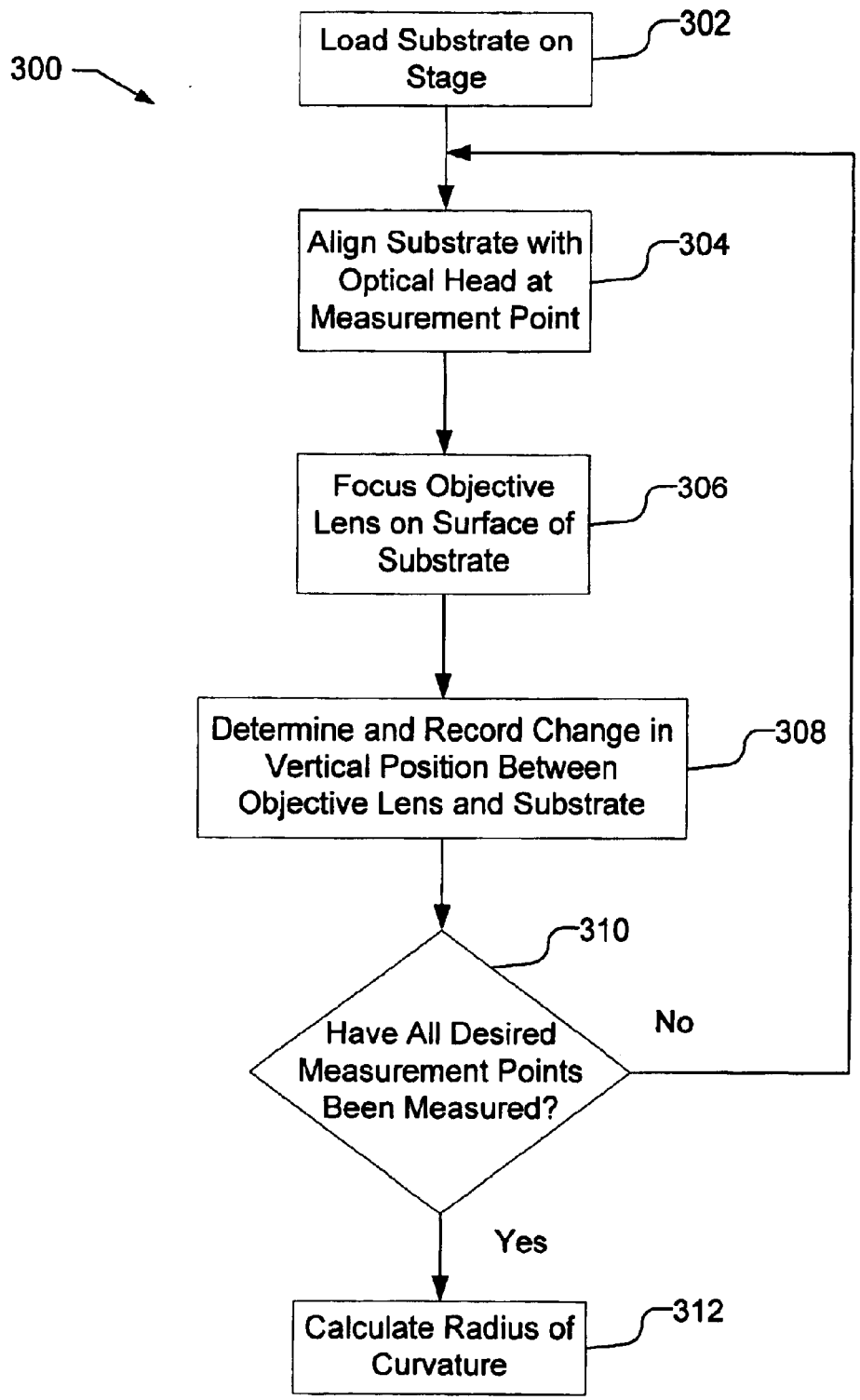
FIG. 3 is a flow chart of an exemplary process of determining the flatness of a substrate, in accordance with an embodiment of the present invention.

FIG. 3 is a flow chart 300 of a process of determining the surface profile of a substrate, in accordance with an embodiment of the present invention. After the substrate is pre-aligned and loaded onto the stage (block 302), e.g., the stage of the metrology tool or the stage of the processing tool, the first desired measurement point on the substrate is aligned with the optical head (block 304). The wafer should be supported on three points with a low friction coefficient so that the wafer can deform to the equilibrium position. Alternatively, it can be supported by three or more points around the perimeter of the wafer. The shape of the wafer will be determined by the intrinsic stress, the location of the three or more support points and the force of gravity.

The distance between the objective lens and the stage is varied to place the focal point of the objective lens on the surface of the substrate (block 306). Once the image of the surface of the substrate is in focus, the distance from the sample to the objective lens is a known value. The focal distance is a function of the optical components of the metrology tool and is essentially constant. In a typical metrology tool, the optical head is held constant while the stage moves in the vertical direction. The closed loop control of the stage motion allows the change in height of the stage to be easily determined. Alternatively, the optical head or only the objective lens can be moved while the stage is held constant. Thus, the objective lens may be focused on the surface of the substrate by vertically moving the substrate (i.e., via the stage), the optical head, the objective lens, or a combination of the above.

The change in vertical position between the objective lens and the substrate is then determined and recorded (block 308). For example, the change in the vertical position of the stage can be determined from closed loop control of the stage. Alternatively, the change in position of the optical head, or objective lens, can be determined, e.g., from an encoder coupled to the optical head or objective lens.

It should be understood that the present invention may use the absolute vertical position, i.e., measuring the vertical position to a stationary component, or a relative vertical position, i.e., measuring the current vertical position with respect to a previous vertical position, e.g., the first measured position.

As discussed above, at least three measurement points are used to calculate a radius of curvature. Thus, as indicate by block 310, the process repeats for each desired measurement point on the substrate, where the change in vertical position between the objective lens and the substrate is recorded for each specific measurement point on the substrate. The measurement points may be, e.g., along one or more diameters of the substrate and there may be three or more measurement points along each diameter.

Once all the desired locations on the substrate are measured, the one or more radii of curvature can be calculated (block 312). A plot of the objective lens position with respect to the substrate for the three or more measured points on the substrate defines, e.g., an arc of a circle, a fraction of a parabola, or a fraction of some complex polynomial shape. A typical simple assumption is that the substrate curvature is circular with only a single radius of curvature associated with an entire diameter. This radius of curvature is mathematically determined from the experimentally derived curve of the surface, which is well within the skill in the art.

Using the process shown in FIG. 3, the surface profile for a substrate may be determined. However, to determine the stress associated with processing the substrate, a differential measurement must be made, i.e., the surface profile must be made before and after processing.

Figure 4:
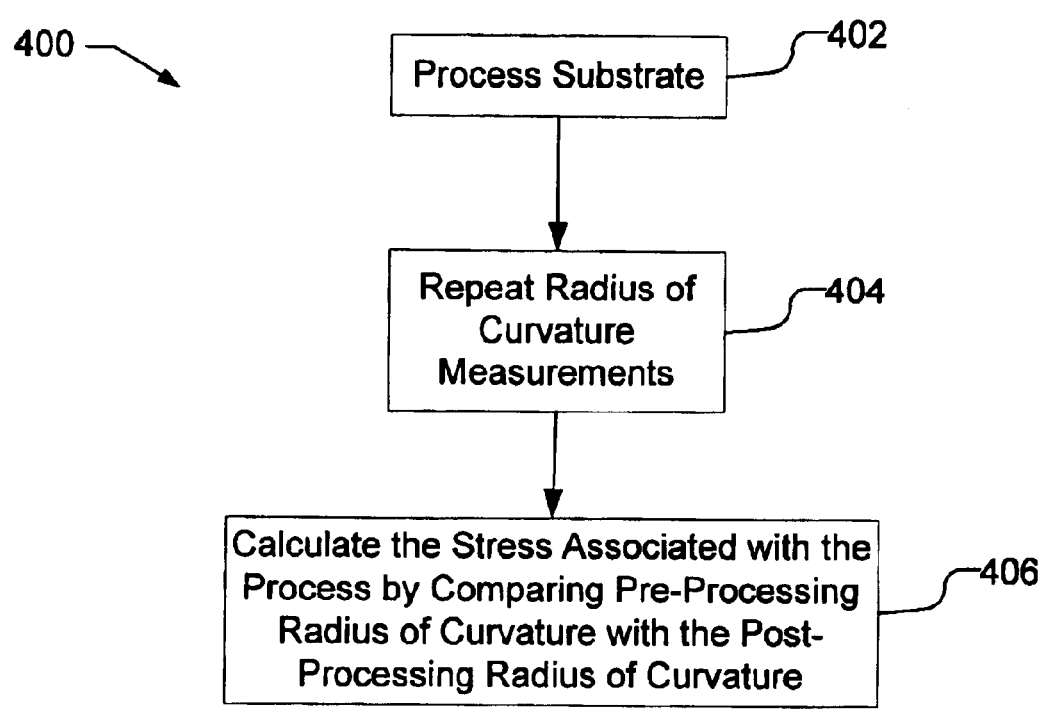
FIG. 4 is a flow chart showing the process of calculating the stress induced on a substrate by processing, in accordance with an embodiment of the present invention.

FIG. 4 is a flow chart 400 showing the process of calculating the stress induced on a substrate, in accordance with an embodiment of the present invention. As shown in FIG. 4, the substrate is processed (block 402), followed by measuring the radius of curvature for the substrate (block 404), e.g., as described in FIG. 3. The radius of curvature should be measured at the same measurement points for the pre-processing measurements and post-processing measurements. To accomplish this, the pre-alignment system 213 can be used to align the wafer in the same orientation before and after processing. The pre-processing radius of curvature and post-processing radius of curvature are compared to determine the change in curvature. Based on the comparison of the radii of curvature, the stress caused by processing can be calculated (block 406) as follows:

$$Stress = \frac{E * t_{sub}^2 \left(\frac{1}{ra} - \frac{1}{rb}\right)}{6 * (1 - \mu) * t_{film}} \qquad \text{eq. 1}$$

where E is the Young's modulus of the substrate material (for a specific crystallographic orientation if the substrate is a single crystal material such as a silicon wafer), $t_{sub}$ is the thickness of the substrate, ra and rb are respectively the experimentally determined pre-processing and post-processing radii of curvature, $\mu$ is Poisson's ratio of the substrate material (for a specific crystallographic orientation if the substrate is a single crystal material such as a silicon wafer), and $t_{film}$ is the thickness of the added film or the amount of film removed by the process.

Equation 1 can be applied to a multitude of locations along a diameter. The result is the calculation of the stress as a function of position along a diameter. If several diameters are measured, a stress map of the entire substrate can be generated.

Thus, with the use of the focusing capabilities found in many metrology tools, e.g., the surface profile and stress caused by processing may be measured. It should be understood that different focusing mechanisms may be employed. For example, a system may use the change in contrast to determine when focus is achieved. Alternatively, a confocal or knife edge mechanism may be used. Typically, the surface profile of a substrate and the various transparent films on the surface of the substrate only modify the focal position by a small amount compared to the required precision for a typical stress measurement. Accordingly, the surface profile of the substrate with the presence of some fraction of transparent films on the surface of the substrate do not significantly degrade a stress measurement that measures the top front surface of the substrate.

Although the present invention is illustrated in connection with specific embodiments for instructional purposes, the present invention is not limited thereto. Various adaptations and modifications may be made without departing from the scope of the invention. For example, various embodiments may be combined to practice the present invention. Moreover, additional or different optical components and focal systems may be used. Therefore, the spirit and scope of the appended claims should not be limited to the foregoing description.

What is claimed is:

1. A method comprising:
   adjusting the focus of a metrology tool to focus on the surface of a substrate at least at three measurement points;
   determining the height of said surface of said substrate at each of said measurement points based on the amount of adjustment necessary to focus said metrology tool on said surface; and
   calculating the radius of curvature between three measurements; wherein calculating the radius of curvature between three measurements points produces a pre-processed radius of curvature;
   processing said substrate;
   repeating the acts of adjusting the focus of a metrology tool to focus on the surface of a substrate at least at three measurement points, determining the height of said surface of said substrate at each of said measurement points based on the amount of adjustment necessary to focus said metrology tool on said surface, and calculating the radius of curvature between three measurements points to produce a post-processed radius of curvature;
   comparing said pre-processed radius of curvature with said post-processed radius of curvature to determine the difference in radius of curvature; and
   calculating the stress associated with said processing based on difference in radius of curvature.

2. The method of claim 1, wherein said pre-processed radius of curvature and said post-processed radius of curvature are for the same measurement points on said substrate.

3. The method of claim 1, further comprising calculating additional radii of curvature for a different set of three measurement points.

4. The method of claim 1, wherein at least three measurement points are on a diameter of said substrate.

5. The method of claim 4, wherein additional measurement points are on a different diameter of said substrate.

6. The method of claim 1, wherein adjusting the focus of a metrology tool to focus on the surface of a substrate comprises moving an objective lens.

7. The method of claim 1, wherein adjusting the focus of a metrology tool to focus on the surface of a substrate comprises moving said substrate vertically.

8. The method of claim 1, wherein determining the height of said surface of said substrate comprises determining the amount of motion required to place said surface of said substrate a known focal distance away from an objective lens of said metrology tool and using said amount of motion to determine said height of said surface of said substrate.

9. A method comprising:
   measuring a first surface profile of a sample based on the adjustment necessary to place said surface in focus in a metrology tool, said surface profile being measured at least at three locations before a process is executed on said sample;
   measuring a second surface profile of said sample based on the adjustment necessary to place said surface in focus in a metrology tool, said surface profile being measured at least at three locations after a process is executed on said sample;
   calculating a first curvature parameter from said first surface profile;
   calculating a second curvature parameter from said second surface profile; and
   calculating the stress on said sample associated with the execution of said process using said first curvature parameter and said second curvature parameter.

10. The method of claim 9, wherein said first surface profile and said second surface profile are made for the same locations on one or more diameters of said sample.

11. The method of claim 9, wherein said measuring a first surface profile and measuring a second surface profile comprises:
    varying the distance between an objective lens in said metrology tool and said sample until said surface of said sample is at the focal length of said objective lens at each individual location; and
    measuring the surface height at each individual location based on distance varied to place said sample at said focal length of said objective lens.

12. The method of claim 11, wherein varying the distance comprises moving said objective lens.

13. The method of claim 11, wherein varying the distance comprises moving said sample.

14. The method of claim 9, wherein said first curvature parameter and said second curvature parameter are radii of curvature.

15. The method of claim 9, further comprising measuring at least one additional parameter of said sample.

16. The method of claim 15, wherein said additional parameter is at least one of a film thickness and film characteristic.

17. An apparatus comprising:
    a stage for holding a substrate, said stage movable to place said substrate at desired locations;
    an objective lens positioned generally over said stage, said objective lens having a known focal distance, wherein the distance between said stage and said objective lens is variable to place the surface of said substrate at said focal distance of said objective lens;
    a computer system coupled to said stage and said objective lens to receive a signal indicating the location of said substrate and a signal indicating the distance varied to place said surface at said focal distance, said computer system having a computer-usable medium having computer-readable program code embodied therein for:

measuring a surface profile of said sample based on the distance varied to place said surface at said focal distance at each location of said substrate;

calculating a curvature parameter of said substrate from said surface profile;

calculating a first curvature parameter for said surface profile before said substrate is processed;

calculating a second curvature parameter for said surface profile after said substrate is processed;

comparing said first curvature parameter and said second curvature parameter to determine a differential curvature parameter; and calculating the stress associated with said processing based on said differential curvature parameter.

18. The apparatus of claim 17, wherein measuring a surface profile comprises:

determining the height of said surface of said substrate at least at three locations of said substrate based on the distance varied to place said surface at said focal distance.

* * * * *